United States Patent
Biswas et al.

(10) Patent No.: US 10,817,749 B2
(45) Date of Patent: Oct. 27, 2020

(54) DYNAMICALLY IDENTIFYING OBJECT ATTRIBUTES VIA IMAGE ANALYSIS

(71) Applicant: ACCENTURE GLOBAL SOLUTIONS LIMITED, Dublin (IE)

(72) Inventors: Araghya Biswas, Navi Mumbai (IN); Rohini M. Nagare, Mumbai (IN); Rajul Agarwal, Bangalore (IN); Shringar Kashyap, Bangalore (IN); Abhilash Manu, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 67 days.

(21) Appl. No.: 16/248,458

(22) Filed: Jan. 15, 2019

(65) Prior Publication Data

US 2019/0220694 A1 Jul. 18, 2019

(30) Foreign Application Priority Data

Jan. 18, 2018 (IN) .............................. 201811002108

(51) Int. Cl.
| | |
|---|---|
| *G06K 9/62* | (2006.01) |
| *G06K 9/46* | (2006.01) |
| *G06N 20/00* | (2019.01) |
| *G06N 3/08* | (2006.01) |
| *G06Q 30/06* | (2012.01) |
| *G06F 3/0482* | (2013.01) |

(52) U.S. Cl.
CPC ......... *G06K 9/6215* (2013.01); *G06K 9/4604* (2013.01); *G06K 9/468* (2013.01); *G06K 9/4652* (2013.01); *G06K 9/6202* (2013.01); *G06K 9/6256* (2013.01); *G06N 3/08* (2013.01); *G06N 20/00* (2019.01); *G06Q 30/0631* (2013.01); *G06F 3/0482* (2013.01)

(58) Field of Classification Search
CPC .............................. G06T 7/11; G06K 9/00744
USPC ........................ 382/128, 225, 131, 132, 103
See application file for complete search history.

(56) References Cited

U.S. PATENT DOCUMENTS

| | | | |
|---|---|---|---|
| 9,727,901 B2 | 8/2017 | Li et al. | |
| 2009/0034812 A1* | 2/2009 | Nowinski | A61B 5/7425 382/131 |
| 2015/0058160 A1 | 2/2015 | Cao | |
| 2015/0065803 A1* | 3/2015 | Douglas | G06T 7/11 600/200 |
| 2017/0124624 A1 | 5/2017 | Agrawal et al. | |
| 2017/0169499 A1 | 6/2017 | Mehrotra | |
| 2017/0255648 A1* | 9/2017 | Dube | G06F 16/583 |

* cited by examiner

*Primary Examiner* — Kiet M Doan
(74) *Attorney, Agent, or Firm* — Mannava & Kang, P.C.

(57) ABSTRACT

An image-based product classification and recommender system employs a machine learning (ML) model for analyzing images for providing relevant recommendations to the users. An input image received from a user device is analyzed by the model for extraction of the image features that correspond to various attributes of a product in the image. A first subset of the image features is initially extracted and then applied to the input image to extract a next set of image features. The output from the model is then used for identifying products that match the user-selected product in the input image. The image-based product classification and recommender system also categorizes products in received images based on product attributes identified from the received images.

17 Claims, 10 Drawing Sheets

DYNAMICALLY IDENTIFYING OBJECT ATTRIBUTES VIA IMAGE ANALYSIS

PRIORITY

The present application claims priority under 35 U.S.C. 119(a)-(d) to the Indian Provisional Patent Application Serial No. 201811002108, having a filing date of, Jan. 18, 2018, the disclosure of which is hereby incorporated by reference in its entirety.

BACKGROUND

Image processing techniques involve creating digital images or performing some operations on the digital images in order to enhance a digital image or obtain some information from the digital image. The input images can include static images such as still photos or dynamic images such as videos, animations and the like. Usually image processing systems treat images as multidimensional signals thereby applying signal processing methodologies for processing the images. Image processing includes importing the images in a desired format, analyzing or altering the images which can include data compression, image enhancement, identifying patterns and the like. The output from image processors can include altered images or other information pertaining to the image analysis executed by the image processor. Image processing is a rapidly expanding field with applications in various aspects of our daily life.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
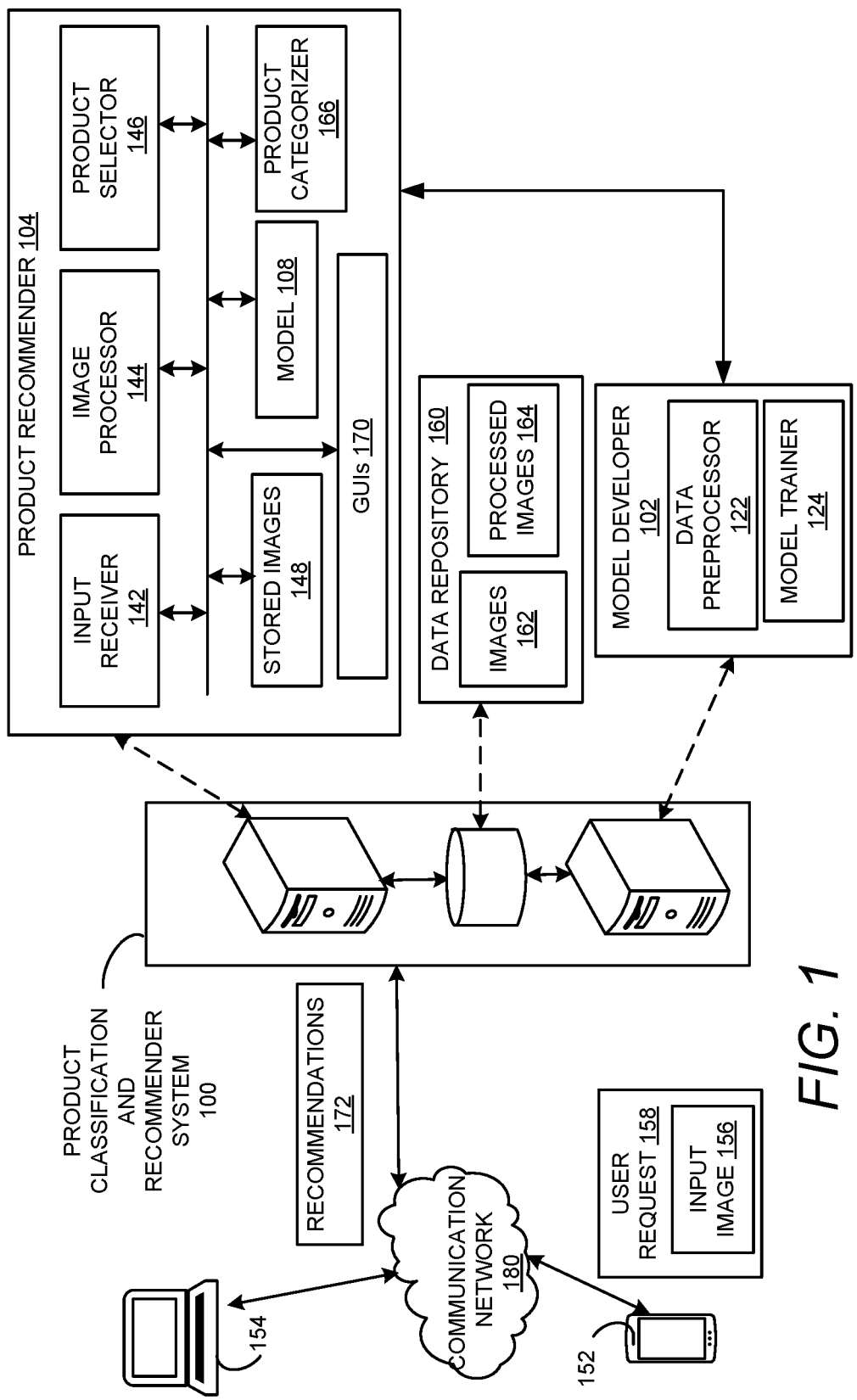
FIG. 1 shows a block diagram of an image-based product classification and recommender system in accordance with the examples disclosed herein.

For simplicity and illustrative purposes, the present disclosure is described by referring mainly to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to one or more examples described herein, an image-based product classification and recommender system is disclosed herein. The recommender system builds a machine learning (ML) based model for identifying products in user-supplied input images and provides recommendations based on visual features extracted from the input images at run time. Training and test data sets are created by collecting images of objects or products to be recognized from various sources and pre-processing the images so that the images fit certain (e.g., predetermined) size and format requirements. The product classification and recommender system is configured to select a pre-trained model which is further re-trained on the training and testing data sets. During the training phase, the model repeatedly analyzes the training data and adjusts values of its parameters until a desired accuracy is attained in the model output. For example, the model can be run until a goal, or desired outcome, is achieved. In an example, the model can be run until model parameter values are identified that result in the model's output achieving a desired accuracy, e.g., a desired accuracy a specified percentage of the time, e.g., an accuracy of 90% in 75 out of 100 model runs. On being trained the model is used to catalogue products and recommend products to users as they shop based on the user selections. In an example, the model can include a deep learning convolution neural network (CNN) customized for use in the recommender system. The CNN can be employed for the image classification, processing and visualization tasks.

An input image received by the recommender system can be analyzed by the model for identifying a product or an object shown in the input image. In some instances, no attributes may be explicitly specified for the product. For example, no textual content such as tags or other identifying indicia accompany the input image. Therefore, the recommender system can employ only the data from the input image for the analysis in instances where no textual content is available. Match scores can be determined for the input image against images of various product categories stored within the recommender system. Based on the match scores, the input image can be initially classified by the model into one or more product categories and/or sub-categories.

In an example, a set of features corresponding to object attributes can be associated with each of the product categories/sub-categories. Therefore, product category classification can be performed by identifying at least a first subset of product attributes corresponding to structural elements or shape features that make up the form of the product in the input image. In an example, further visual features or a second subset of product attributes can be obtained using the first subset of features. More particularly, a grayscale version of the input image is generated and the contrast between the various regions of different shades is enhanced in order to delineate the contours between the various regions corresponding to the different shades.

The second subset of product attributes may include certain missing attributes of the product that are yet to be identified. For example, colors of the various structural elements of the product cannot be identified based on the product categorization. A programmatic interface, such as a Python interface, can be employed for color identification. In an example implementation, the input image can be captured in an 8-bit, unsigned integer, Blue Green Red (BGR) format. Upon identifying the various colors in the input image, the first subset of attributes corresponding to the structural elements extracted as detailed above from the input image can be superimposed on the input image so that the second subset of attributes associated with the regions or parts of the product in the image corresponding to the various colors can be identified.

The recommender system then executes a product matching process wherein a set of stored images corresponding to the various products are scored for similarity with the various attributes of the product in the input image. Similarity scoring techniques that are currently known can be employed for obtaining the similarity scores in accordance with the disclosed examples. The similarity scores are compared and the products having higher similarity scores can be provided as recommendations in response to the received input image. Ancillary information such as but not limited to data from product catalogs, customer behavior, past sales etc. can be employed by the recommender system in identifying product matches. The product categorization, extraction of product attributes from the input image and identification of matching products can occur in real-time or during the course of a transaction or in the same user session. Therefore, a user can take a picture of a product that the user likes, upload the image to the recommender system and expect the recommender system to respond with relevant product recommendations, all within a single user session. The recommender system disclosed herein thus takes into account user habits in providing real-time recommendations besides compensating for the difficulties in articulating search queries or in attribute assignments by users.

When a product is conceptualized and designed, the product attributes are highlighted and get assigned in the Product Information Management (PIM) System manually. But manual cataloguing of products wherein a human user peruses each product image is an inefficient task in terms of time and accuracy. If some of the attributes (collar type/sleeve length/pattern etc.) are not linked accurately to a product or are missed, it can impact product planning, inventory, product search (which are mostly performed based on product attributes). The image-based product classification techniques disclosed herein enable large scale automated categorization of products into various product categories or subcategories based on product features extracted from the images regardless of the additional textual information that is supplied with the images.

Visual features are the first basis of selection of products by users. However, conventional recommender systems analyze textual data describing products and user behavior to identify and recommend matching products to users. It may happen in some instances that a user is unable to articulate properly in a textual query or the exact features the user desires in a certain product. This may be due to lack of knowledge of terminology or language barriers on the user's behalf. While image-based searches mitigate the need for the user to articulate a search query or make selections of various criteria for product searches, image-based searches can be time consuming. This is because the received input image has to be processed to not only identify the object or product in the image but also to extract the image features if matching recommendations are to be provided. The extracted attributes may need to be matched to a pool of hundreds or even thousands of images to identify the relevant matches. The identification of the products in the user images, extraction of product attributes and determining relevant recommendations are required to occur in real-time, e.g., during a single session if image searches are to be of practical use in product recommender systems.

Therefore, speeding up the image analysis and processing tasks becomes necessary to enable the image searches to receive recommendations at a rate offering acceptable performance to users. Images are generally analyzed as n-dimensional representations such as n-dimensional vectors or tensors wherein the various dimensions correspond to the various image features. Conventional image analysis procedures typically process all the dimensions of an n-dimensional representation simultaneously which can lead to slower responses from the recommender system. The process of identifying a first subset of attributes and then employing the first subset of attributes to identify the missing attributes provides for a technical improvement to the recommender system in that the image analysis procedure is sped up by simplifying the number of dimensions of a vector that are to be processed simultaneously. Moreover, the model including the CNN can have neurons with learnable weights and biases which allows for a model that is highly customized to a specific recommendation. This is in contrast to conventional systems wherein certain modules are provided as black boxes not suitable for customization. Additionally, the model disclosed herein can be developed using tools, such as Python, which makes it platform independent thereby facilitating the execution of the recommender system on a variety of platforms.

FIG. 1 shows a block diagram of an image-based product classification and recommender system 100 in accordance with the examples disclosed herein. The product classification and recommender system 100 includes a model developer 102 and a product recommender 104 along with one or more data repositories 160. Users may employ user devices such as 152 or 154 to access user interaction tools of the recommender system 100 such as the graphical user interfaces (GUIs) 170 of the product recommender 104 which can be made available as one or more of an ecommerce website or a mobile 'app' in order to allow user selection of preferred goods or products. The recommender system 100 can be accessed by the user devices 152, 154 via a communication network 180 to provide input images for which the relevant recommendations are sought by the users.

An input receiver 142 included in the product recommender 104 can receive a user request 158 for recommendations. In an example, the user request 158 can include one or more of text and images such as an input image 156 provided to the recommender system 100 by one of the user devices such as the user device 152. In an example, the input image 156 can be an original image generated by the user device 152, such a product which was captured by a camera of the user device 152. In an example, the input image 156 can be an image which was received by the user device 152 and is forwarded to the recommender system 100. In either case, the recommender system 100 need not possess prior information or data regarding the input image 156 or the product in the input image 156. Based on an analysis of the input image 156 in real-time in accordance with methodologies detailed herein, products can be selected for recommendation to the user by the product recommender 104.

The relevant products thus selected can be transmitted to the user device 152 for further review and purchase by the users. A product selector 146 employs a trained model 108 to identify products similar to the input image 156. An image processor 144 included in the recommender system 100 analyzes the input image 156 to identify a product imaged therein, including the features of the imaged product. The features of the input image 156 may be compared to attributes of stored images 148 to find similar images or products in an image matching process. In an example wherein textual data is available for use along with the image similarity, the percentages of similarity between the textual elements and the images can be combined in a predetermined manner with particular weighing factors to identify similar products from the stored images 148. The stored images 148 can be stored locally by the product recommender 104 or the stored images 148 can be stored remotely in product databases from which they are retrieved by the product recommender 104.

As mentioned above, the recommender system 100 may not possess prior data regarding the input image 156 or the product in the input image 156. Hence, the image processor 144 analyzes the input image 156 to not only identify the product in the input image 156 but also to extract the various attributes of the product in the input image 156. The ML model 108 is employed for the analysis of the input image 156 in order to extract the various attributes of the product in the input image and to identify relevant products from the stored images 148. Since, the analysis of a previously unknown image such as the input image 156 occurs at the image processor 144 in real-time during the course of a transaction, the ML model 108 is customized to analyze the input image 156 in a manner that optimizes accuracy with the processing speed. In an example, the input image 156 can be analyzed by the ML model 108 as a multi-dimensional vector e.g., a tensor wherein the various dimensions correspond to the various image features. The ML model 108 can be configured to analyze lower dimensional representations or lower dimensional vectors of the input image 156 that corresponds to a subset of a possible set of image features. Then one or more of the remaining image features can be selected for further analysis thereby speeding up the image processing. The order in which the image features are analyzed may be determined empirically. For example, the features pertaining to the structure of the product such as a garment in the input image 156 can be initially selected for analysis and upon identifying the structural elements of the product, the color features of the structural elements can be identified. The image features thus extracted can be employed for identifying relevant items by the ML model 108.

At a high-level, the image features can be represented by vectors of numeric values. A product selector 146 executes an image matching process whereby distances between feature vectors of the input image 156 and the feature vectors of the stored images 148 are obtained. The stored images 148 can be scored and ranked based on aggregated feature vector distances. Products associated with highly ranked images are transmitted as recommendations 172 to the user device 152 by the product selector 146 for presentation to the users. It can be appreciated that the recommender system 100 is thus configured to analyze received images in real-time and select similar images from a set of stored images 148 for product recommendations.

Prior to providing recommendations, the ML model 108 can also be employed to analyze and categorize the stored images 148 which can initially belong to different categories of products associated with the product recommender 104. For example, the ML model 108 can be trained to identify various garments as detailed further infra. Based on the features obtained from the stored images 148, the attributes of the corresponding products can be identified by a product categorizer 166 using the ML model 108 thereby enabling categorizing the products pictured in the stored images 148 into various product categories. The stored images 148 can be tagged with the attributes of the corresponding products. The ML model 108 therefore enables not only categorizing a product into a primary product category but also enables placing the product under a sub-category of the primary product category. Referring to an example of garment categorization, the ML model 108 can be trained to not only identify various garments such as shirts, pants, skirts and the like from the stored images 148 but also to further sub-categorize the identified garments based on product attributes such as colors, structural elements, fabrics etc. The shirts may therefore be tagged with sub-categories based on sleeve length, collar type, material etc.

In an example, the ML model 108 can be a CNN that is trained to identify particular objects from various images. A model developer 102 can be configured to build AI elements including the CNN which is employed as the ML model 108 by the product recommender 104. The recommender system 100 takes into consideration, product features as extracted from images provided, viewed and selected by the users in addition to textual product information for identifying relevant recommendations. The model developer 102 is configured to create training and test data for training the ML model 108 to recognize objects in images and extract product attributes. The model developer 102 includes a data preprocessor 122 for generating the training data for the ML model 108. In an example, the training data can include processed images 164 of various products. The images 164 are altered and sized evenly for improving feature identification by the ML model 108. The recommender system 100 may receive digital images 162 via the communications network 180. Images 162 can be collected from various sources available online such as search engines, social media, and images exchanged in communications such as email, instant messages and the like. Offline image sources can include equipment like optical scanners, digital cameras, user devices 152 or 154 and the like. The images 162 can be provided in files, e.g., Joint Photographic Experts Group (JPEG), Graphics Interchange Format (GIF), Tag Image File Format (TIFF), Portable Network Graphics (PNG), or Bitmap (BMP) files by any number of sources. The images 162 may be provided in digital video and generated from one or more frames of digital video. The images 162 and the processed images 164 can be stored in the data repository 160. By way of illustration and not limitation, services like S3 (Simple Storage Service) can be used to store the images.

Images 162 which are initially accessed may be cropped to form standard sizes, for example, 24×24 pixels centrally for evaluation and training. In addition, the images 162 may be further approximately whitened, flipped, distorted and further tiled based on categories. The processed images 164 can include images of various product types such as those related to fashion, industrial equipment, furniture or other such goods. The processed images 164 may include images tagged with attributes that are to be learnt by the ML model 108 in supervised learning according to one example. In accordance with another example, the processed images 164 may not be tagged with the attributes thereby facilitating unsupervised learning. The processed images 164 may not only include images for initially training the ML model 108 but may also include testing and validation data sets. The ML model 108 can thus be trained to identify various attributes of objects in the images 164. By way of illustration and not limitation, if the images 164 include clothing items, the ML model 108 can learn to not only differentiate between clothing items such as shirts, pants, skirts, blouses, hats, sweaters etc. but also to identify various attributes of the variety of clothing items. For example, the ML model 108 can identify attributes of a pant including the size, color, length, pockets, pleated/plain front, casual/formal, material etc. Similarly, other clothing items may have their own unique attributes that enable identification by the ML model 108.

The model developer 102 can be initially provided with a predefined model which is trained using the processed images 164. Accordingly, the model developer 102 includes a model trainer 124 that configures the initially-provided model to repeatedly analyze the training images 164 and change values of the learning parameters to identify parameter values that result in the ML model 108 providing accurate results. The ML model 108 can be trained to not only identify the objects in the images but can also be trained to identify attributes of the objects imaged such as but not limited to, shapes and dimensions of the object in an image, individual object features such as shapes and dimensions of certain portions of the object in the image, the foreground and background color of the image, the various colors of the object including identifying most prominent and less prominent colors and the like. It may be understood that various elements of the recommender system 100 are discussed with respect to examples using clothing items for illustration purposes only and that the recommender system 100 can be similarly employed for identifying similar objects from the input received from one or more of the user devices 152, 154 based of course, on the training that was received by the ML model 108. Models that are created are generally tested for performance in order to optimize and improve the performance. The ML model 108 generated herein can be tested for accuracy and optimization using visualization tools such as but not limited to Matplotlib. In an example, the cost and accuracy can be plotted against the iterations to obtain the rate of loss and learning. Such factors can be visualized using packages like Matplotlib. Based on the visualized data, the ML model 108 can be fine-tuned and changed upon optimization to address performance issues. After successful generation and training of the ML model 108, the product recommender 104 employs the ML model 108 for various tasks as detailed above.

The data repository 160 may include a database comprised of database tables or another type of data storage system. The data repository 160 can be implemented as a standalone or distributed repository. In an example, the product classification and recommender system 100 can be implemented as a container-based system. Containers allow packaging an application with the necessary components such as libraries and other dependencies into a single package. The ML model 108 when loaded, takes an image as input, classifies it and based on the classification, extracts the attributes of product(s) in the image. The attribute values as obtained by the ML model 108 may be transmitted to the product recommender 104 by a web service, such as Flask for example, for transmission to the user device 152.

Figure 2:
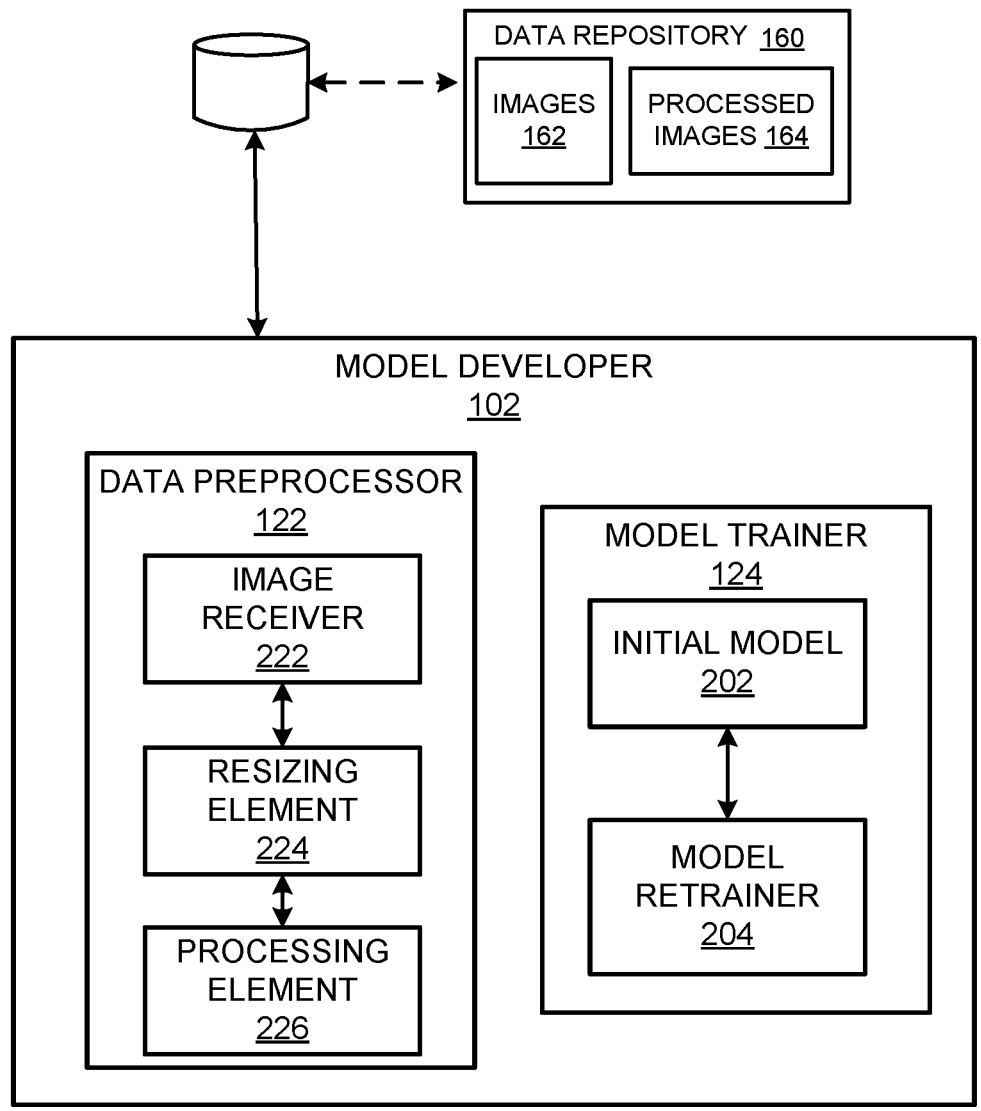
FIG. 2 shows a block diagram of a model developer in accordance with the examples disclosed herein.

FIG. 2 shows a block diagram of the model developer 102 in accordance with the examples disclosed herein. The model developer 102 includes the data preprocessor 122 and the model trainer 124. The data preprocessor 122 further includes an image receiver 222 which searches the various data sources for different images to train the ML model 108. In an example, the products or objects which the ML model 108 is to recognize may be predetermined, and the images 162 pertaining to the products to be recognized may be automatically located from the various image sources and downloaded by the image receiver 222. In an example, the image receiver 222 can include a web crawler which can use textual search queries to search for, gather various webpages and download the images therein. A resizing element 224 resizes the downloaded images to be either smaller or larger to fit a predetermined size or a standard size suitable for training purposes. A processing element 226 can also be included in the data preprocessor 122 so that the images for example are whitened, flipped, and further tiled based on categories. The images 164 thus processed are stored in the data repository 160

In an example, the ML model 108 can include CNNs with multiple layers. The multiple layers may include an input layer, processing or decisions layer and an output layer to detect and classify particular features of images relevant for a problem being addressed. Each layer of the CNN typically has a multitude of parameters associated with it. The specific values of those parameters necessary for a successful and accurate image classification may not be known a priori. Examples of the model trainer 124 as disclosed herein enable selecting an initial predetermined ML model 202, and training the initial model 202 using the processed images 164 to obtain the ML model 108 that can be used for product cataloguing and recommendations.

The initial model 202 can include CNNs that are used mainly in image processing and visualization tasks. Traditional convolution layers include groups of neurons in parallel that get the same input and compute different features. For example, in a 2-dimensional layer, a neuron might detect a vertical edge while another neuron detects a horizontal edge while yet another neuron might detect a color contrast. CNNs are made up of neurons that have learnable weights and biases. Such CNNs are somewhat similar to a Recurrent Neural Networks (RNN) except that the CNN architecture makes the explicit assumption that the inputs are images so that certain properties can be encoded into the architecture. The CNN used for the model generation can be a n*n (n is a natural number and n=1, 2, 3 . . . ) convolutional layers stacked on top of each other in increasing depth. The reducing volume size can be handled by max pooling and the n−1 connected layers are followed by a softmax classifier.

A model re-trainer 204 included in the model developer 102 can be configured to execute a script that loads the initial model 202. By way of illustration and not limitation, the initial model 202 can include a customized CNN which can bear similarity to Visual Geometry Group (VGG). VGG is a network of increasing depth with 16 or 19 weight layers. To reduce the number of parameters in such deep networks, small 3×3 filters are used in the convolutional layers. Similarly, the customized CNN can have multiple blocks of layers which perform similar tasks as the blocks of layers in VGG model. In an example, a single block of layer can contain i) an input layer to the convolutional layers which can also act as a normalizer and ii) 2-3 convolutional layers with increasing depth in which the "convolutional operation" is carried out on the input using features. The feature map obtained is subjected to "max-pooling" and can act as an input to the next block. Each block can be normalized and repeated on a loop 5-6 times for example. The standard softmax classifier can then be applied. Furthermore, the number of blocks in the customized CNN are not fixed and can be varied based on a developer's input. As a result, the customized CNN can be a more shallow layered network with less number of layers as compared to VGG. The customized CNN is thus more effective in that the computational efficiency is increased with decreased training time.

The ML model 108 generated upon training the initial model 202 also includes various layers L1, L2 . . . Ln which correspond to decision functions that enable executing tasks such as identifying specific colors, detecting a vertical edge and the like. When new images are provided to the ML mod& 108 during a training phase, the new images are analyzed by the various functions corresponding to the layers L1, L2 . . . Ln thereby identifying the features in the new images.

Figure 3:
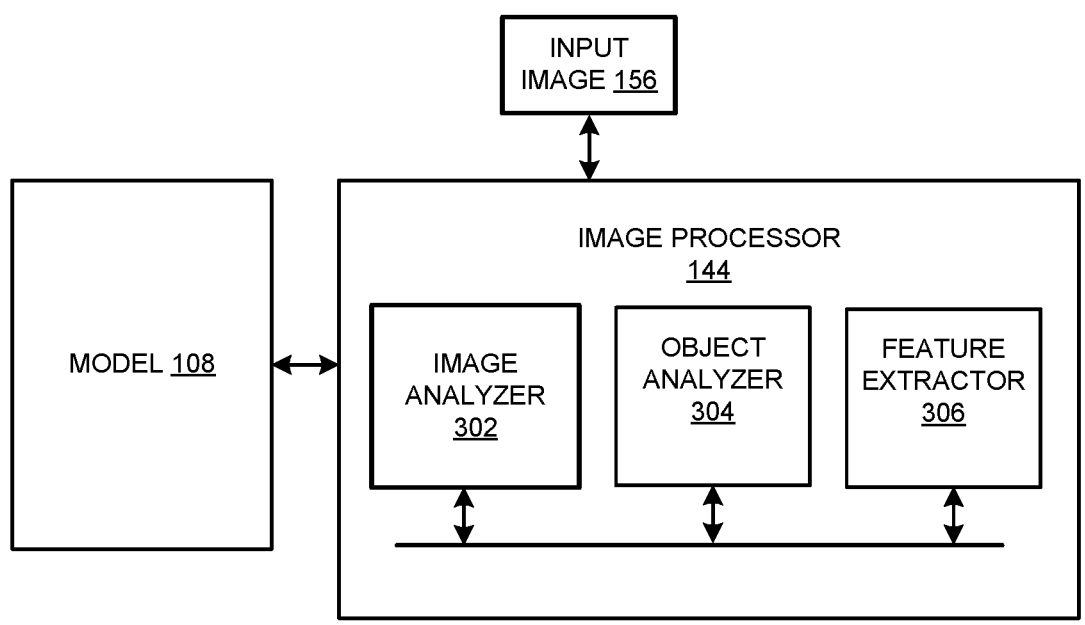
FIG. 3 shows a block diagram of an image processor in accordance with the examples disclosed herein.

FIG. 3 shows a block diagram of the image processor 144 in accordance with the examples disclosed herein. The image processor 144 receives an input image 156 which may be pre-processed by the image analyzer 302 to conform to certain size or other requirements in a manner similar to the processed images 164. Accordingly, the input image 156 can be resized, reoriented, whitened, flipped, distorted, etc. by the image analyzer 302. It may be noted that the image processor 144 has no prior data such as the object or product imaged therein, the image and/or product attributes, etc. The image processor 144 may therefore be required to identify a product in the input image 156 that wasn't available previously and has to find relevant recommendations based on the product in the input image 156. In an example, the image analyzer 302 may also generate a grayscale version of the input image 156.

The input image 156 can be passed as an argument with a script to the object analyzer 304 and the accuracy of the image is detected and computed by the ML model 108. As mentioned above, the ML model 108 can be trained to identify different types of objects or products of different categories. Referring to the example of the clothing items, the ML model 108 can be trained to identify the various clothing items. If the product in the input image 156 is identified as a shirt, sub-categories such a formal shirt or a T-shirt can also be identified. Different scores are calculated for the input image 156 for each category/sub-category combination. The input image 156 is then classified into a certain product category with the highest score predicted by the ML model 108. Accordingly, the attributes of the product can be extracted by the feature extractor 306.

However, analyzing the input image 156 for all the image features or product/object attributes at the same time can be not only processor-intensive but also time consuming. In order to speed up the real-time image analysis, the feature extractor 306 can be configured to extract certain predetermined subset of attributes of the product in the input image 156. More particularly, referring to the example of categorizing garments, the feature extractor 306 can be configured to initially extract a subset of the attributes that can be obtained from the input image 156. Referring again to the example of a shirt, a first subset of features pertaining to the structural elements or attributes of the product/garment in the input image 156 can be extracted. The structural elements of a shirt can include the collar, sleeve, body of the shirt, pocket, designs or patterns on the shirt, the buttons, etc. The structural elements of the product in the input image 156 can be derived via increasing the contrasts in the grayscale version of the input image 156 generated by the image analyzer 302. In the example, the ML model 108 includes a CNN, the various layers can be used to extract the various attributes of the product in the input image 156. The contours delineating the various regions of different shades can be identified as the first subset of image features.

The first subset of features from the feature extractor 306 are then employed to identify further image features or a second subset of image features that correspond with different product attributes. For example, the contours which were extracted can be superimposed on the input image 156 to obtain the image color features or color attributes of the product. The colors in the input image 156 cannot be detected using normal classification methods. A custom-built image classifier developed without using any frameworks is used. To detect and classify only the colors in the input image 156, a Python package called OpenSource Computer Vision Library (OpenSource CV) can be used. A Python interface is thus employed for color and object/product detection by the image processor 144 in some examples. OpenCV usually captures images and videos in 8-bit, unsigned integer Blue Green Red (BGR) format. Captured images can be represented as 3 matrices Blue, Green and Red with integer values ranging from 0 to 255. A Hue, Saturation, Value (HSV) color space is also used for image color segmentation.

The hue is unique for that specific colour distribution of the object, but saturation and value may vary according to the lighting condition of that environment.

Hue values of basic colors are given below:
Orange 0-22
Yellow 22-38
Green 38-75
Blue 75-130
Violet 130-160
Red 160-179

In an example, a morphological opening and a morphological closing are determined after applying erosion and dilation on the images applied with threshold values.

Figure 4:
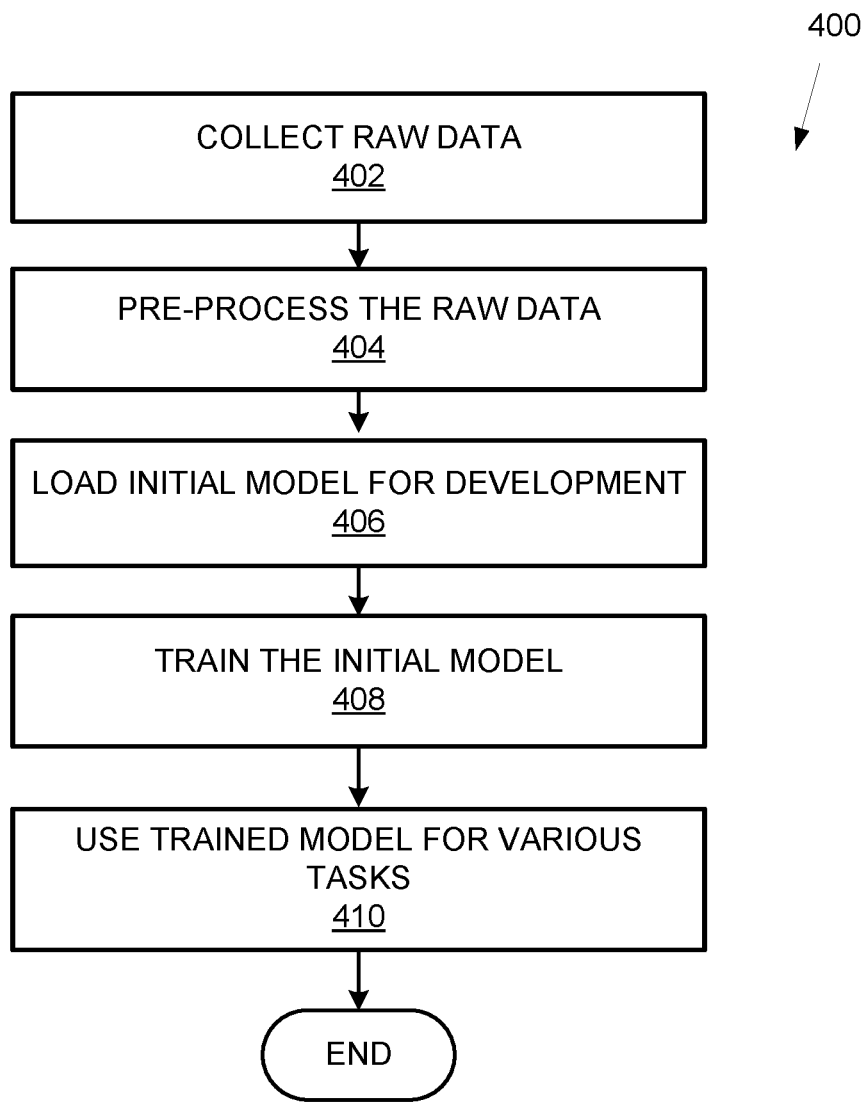
FIG. 4 shows a flowchart that details a method of developing a convolution neural network (CNN) for cataloguing and recommendation purposes in accordance with examples disclosed herein.

FIG. 4 shows a flowchart 400 that details a method of developing a CNN for cataloguing and recommending in accordance with examples disclosed herein. The method begins at 402 wherein raw data, such as the images 162 to train a predefined model, is collected from various sources as detailed herein. The raw data includes images of various categories of objects that the initial ML model 202 is to be trained on to recognize. Images of various sizes, formats, colors and the like may be collected at 402 and saved using services such as S3 from Amazon. The images may be stored as objects in S3 buckets and the S3 buckets can hold trained image classifying models as well. The images collected at 402 are pre-processed at 404 as the pre-trained models may need training data in particular formats. Pre-processing at 404 can include re-sizing images to a pre-determined standard size, whitening, flipping, distorting and further tiling based on categories. At 406, the initial predetermined model 202 is loaded for training. The initial model 202 can include a customized CNN with architecture similar to VGG as described herein.

Conventional usage of CNN models within premade packages such as TensorFlow involves a certain black box functionality wherein some modules of the development software are not accessible to the programmer for customization. The ML model 108 is developed in Python in accordance with some examples disclosed herein which makes the ML model 108 platform-independent. As a result, more parameters of the ML model 108 can be controlled by the developer. By way of illustration and not limitation, the number of filters, the activation functions, the type of activation functions etc. can be controlled without the wrapper functions. Functions such as Soft Max or sigmoid functions may also be used. One flexibility enabled by the customized CNN includes an option for a developer to provide an input for the number of blocks in the customized CNN. The developer may vary the number of blocks based on the accuracy and the requirements. For example, if the task pertains to classifying a handwritten digit, a single block may suffice within the customized CNN whereas for more complex patterns the number of blocks can be increased for greater accuracy. In fact, the weights of the hidden layers of the ML model 108 can also be controlled or modified. Therefore, the output of a particular inner layer of the CNN can be altered before the output is sent to a consecutive upper layer.

The initial model 202 is trained at 408 on one or more product categories to identify the products from received images in addition to being trained on identifying product attributes with fine granularity so that a fully trained model such as the ML model 108 can discriminate between products with different attributes within a product category. By way of illustration and not limitation, the ML model 108 can be trained for image-based recognition of not only various types of garments such as trousers, shirts, skirts and the like but can also be trained to identify trousers or skirts or shirts with particular attributes based on images without the necessity for tags or other textual descriptions that usually accompany the images. At 410, the trained model can be used for various tasks such as product cataloguing or recommendations in accordance with examples described herein.

Figure 5:
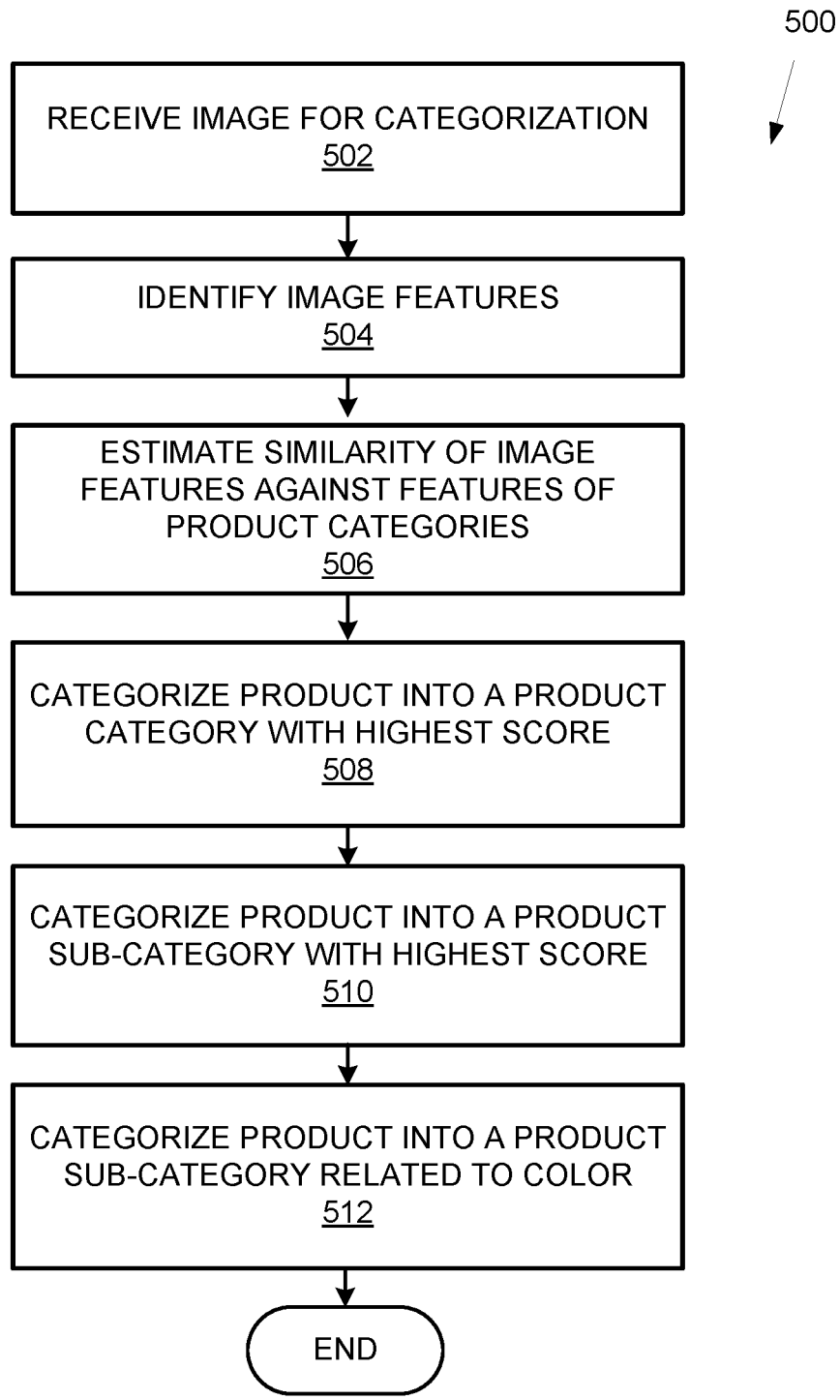
FIG. 5 is a flowchart that details an image-based method of cataloguing products using a trained model in accordance with examples disclosed herein.

FIG. 5 is a flowchart 500 that details an image-based method of cataloguing products using a trained model in accordance with examples disclosed herein. The method begins at 502 wherein an image for a product which is to be categorized into one or more of the product categories is received. In an example, an image may be given as an argument with a script at 502. It can be appreciated that the one or more product categories can involve product sub-categories. For example, a product category such as a shirt can have product sub-categories such as a long-sleeve shirt, a short-sleeve shirt or a sleeveless shirt. At 504, the various image features are extracted by processing the received image through the various layers of the CNNs comprised by the ML model 108 in accordance with the examples disclosed herein. The output features related to the various contours, lines, and colors including predominant or secondary colors, foreground or background colors. Also, textual or non-textual characters such as insignias, trademarks, logos and the like can be obtained at 504. As mentioned above, the set of image features can be extracted in two or more steps.

At 506, the image is scored against each product category that is categorized by the product classification and recommender system 100. In an example, similarities between the feature vectors of the image and feature vectors of the various product categories can be estimated at 506. In an example, similarity measures such as cosine similarity may be used. The product is categorized into a product category with the highest score or the greatest similarity at 508. The product can be categorized not only into a broad product category but may also be classified under sub-categories. The received image can be encoded as a series of Red Green Blue (RGB) numbers which not only provide color data but also gradients wherein color variations can be traced in order to delineate the contours of the product pictured in the image. Based on a comparison of the encoded values with the various values of the product categories and sub-categories, a sub-category of the product in the received image may also be identified at 510. In an example, similarity calculations as detailed above for category identification can be executed between the feature vectors of the received image and the features of each of the sub-categories of the product category. The product is categorized into the highest scoring sub-category of the product category. This categorization can be continued up to a level until which a hierarchy of sub-categories are defined. Further classification based on features associated with colors are then executed at 512 based again on the RGB values as detailed above thereby categorizing the product into particular color-based product subcategory.

Figure 6:
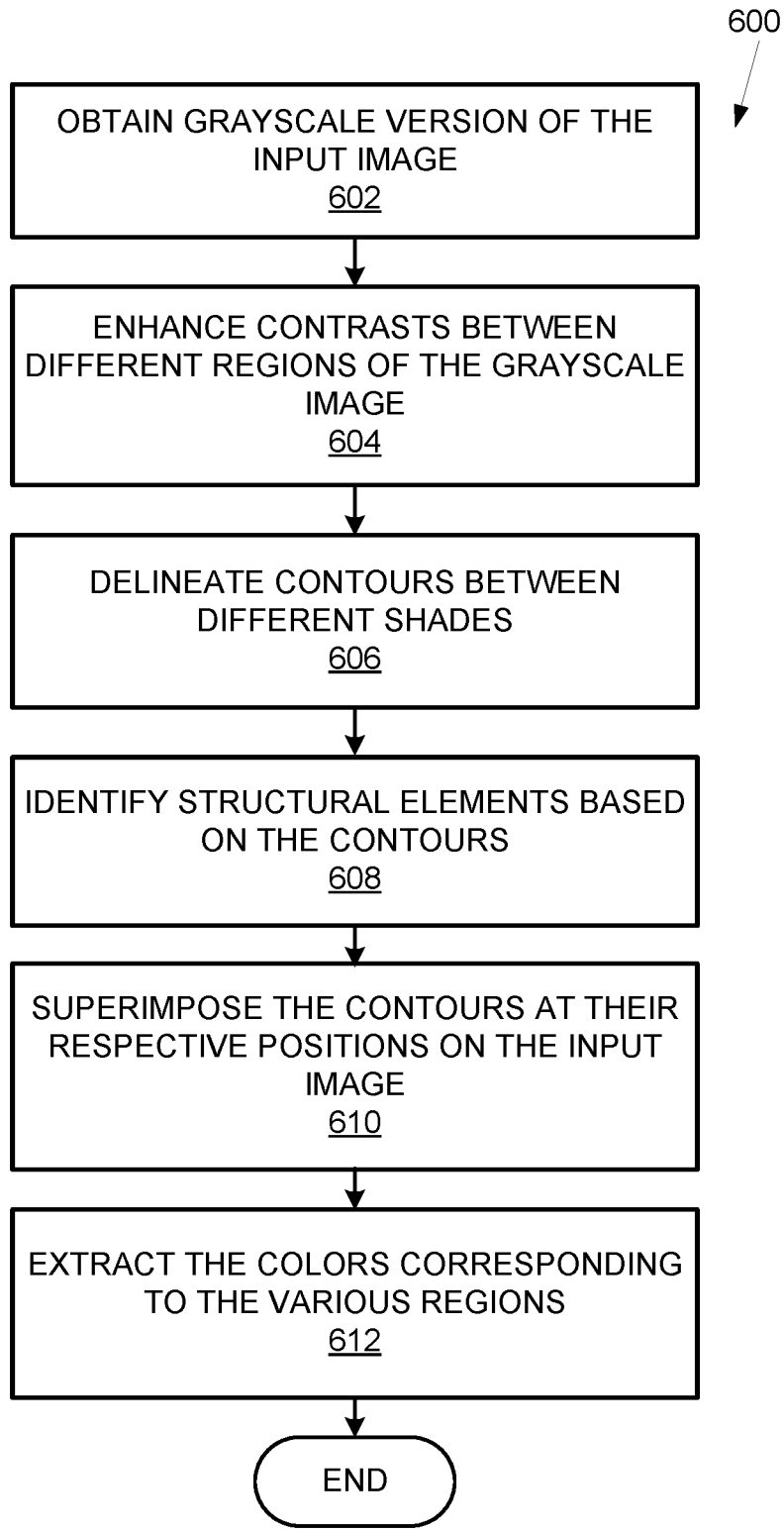
FIG. 6 shows a flowchart that details a method of extracting image features in accordance with the examples disclosed herein.

FIG. 6 shows a flowchart 600 that details a method of extracting image features in accordance with the examples disclosed herein. The method begins at 602 wherein a grayscale version of the input image 156 is obtained. A first subset of the image features are initially extracted. The determination regarding the particular subset of attributes to be first extracted can be coded into the ML model 108. The different colors of the object in the input image 156 can correspond to various shades of gray, white or black that are spread on different regions of the object in the input image 156. At 604, the contrasts between different shades in the grayscale image is enhanced. The contours between the different shades with the enhanced contrasts are delineated at 606. The contours are identified as the structural elements of the object at 608 which can correspond to the first subset of image features or attributes of the product in the input image. A second subset or a next subset of attributes can be extracted using the first subset of attributes. The contours thus extracted are therefore superimposed at their respective positions on the original image or the input image 156 received from the user at 610. Upon the superimposition, the colors corresponding to the various regions outlined by the contours are extracted at 612 as the color elements for the object or the product that need to be matched for identification of the relevant products by the recommender system 100.

Figure 7:
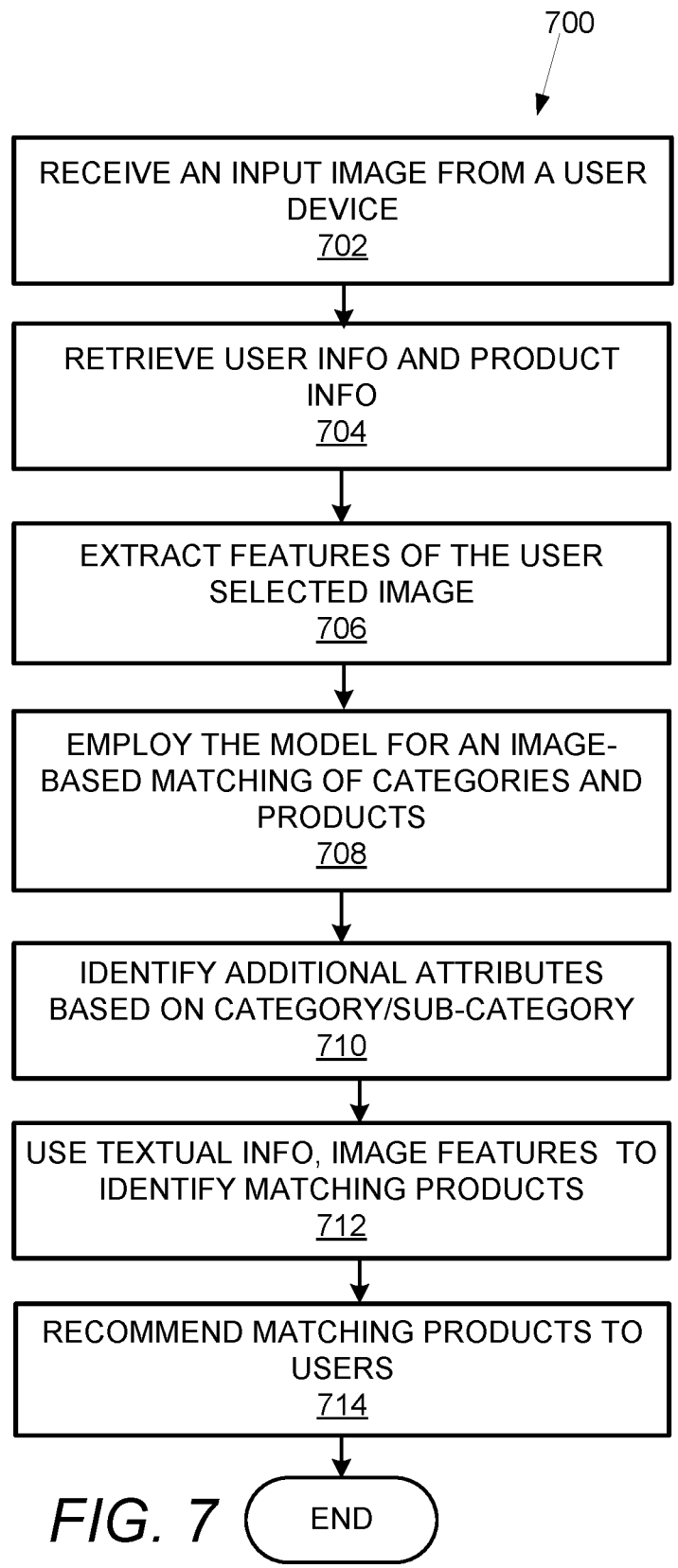
FIG. 7 is a flowchart that details a method of generating recommendations in accordance with examples disclosed herein.

FIG. 7 is a flowchart 700 that details a method of generating recommendations in accordance with examples disclosed herein. Data from various sources and visual features extracted from selected products are fed to the ML model 108 which identifies similar products that match user selections (for example, from the shopping cart or a wish list etc.) for presentation to the user. The method begins at 702 wherein the input image 156 which is generated by the user is received. In an example, the input image 156 can be an image selected by the user from a plurality of images received at the user device 152 from the recommender system 100. One or more of text-based user information and product information are retrieved at 704. Text-based user information can include explicit information provided by the user in a user profile (if available), implicit information such as purchase frequency and other patterns that can be determined from the user profile and the like. In an example, text-based user information can also include user behavior as detected from user-behavior tracking mechanisms such as cookies and the like. Text-based product information can include detailed product description from product catalogs, past sales, categorization, user-provided tags or reviews/ratings and other information that is available to the product recommender 104. In an example, retrieving user info (information) and product info can include parsing the textual information to identify product attributes. The features of the received image are extracted at 706 via processing of the input image 156 by the ML model 108 as detailed above. The ML model 108 is further employed for an image-based matching of categories, sub-categories and products at 708 in accordance with examples disclosed herein. Each category of products may have unique attributes that define the product so a collection of attributes based on the product category or domain may be required in order to identify matching products. For example, when matching products involves goods such as mechanical items, industrial equipment and the like, color may not be listed in the attributes to be matched whereas for a garment product category, color is an attribute that is frequently used. Accordingly, product-specific attributes are selected for matching at 710. Referring to the example of identifying garments, color is also identified in addition to structural attributes. To detect and classify only color, OpenCV (Open Source Computer Vision Library) is used.

The textual information and features of the matching products obtained based on image processing are employed at 712 to identify more accurate matches. In some examples, the purchase history of the user providing the input image 156 can also be employed to identify relevant recommendations. The textual information and image features may be used to identify product attributes that match attributes of the product pictured in the image received at 702. The textual features associated with each of the products can be provided as input to the ML model 108. Word lists that describe features, functions, model numbers, colors and other attributes of the products may be created from the vocabulary corpus. Additionally, each document of free text may be turned into a tabular data frame (vector) that can be used as input for the ML model 108.

The image features can also be converted into similar format for inputting to the ML model 108. An image feature vector is an abstraction of an image used to characterize and numerically quantify the contents of an image. Generally, real, integer or binary values may be used for the image feature vectors. The above mentioned numerical data frames representing the textual information and the image feature vectors can be provided as input to the ML model 108 which provides the expected output. Techniques such as but not limited to, collaborative filtering and heuristics may be employed to provide the recommendations. The matching products are recommended to the users at 714, for example, via displaying the matching products on the user devices 152, 154 via a website or the mobile app etc.

Figure 8A:
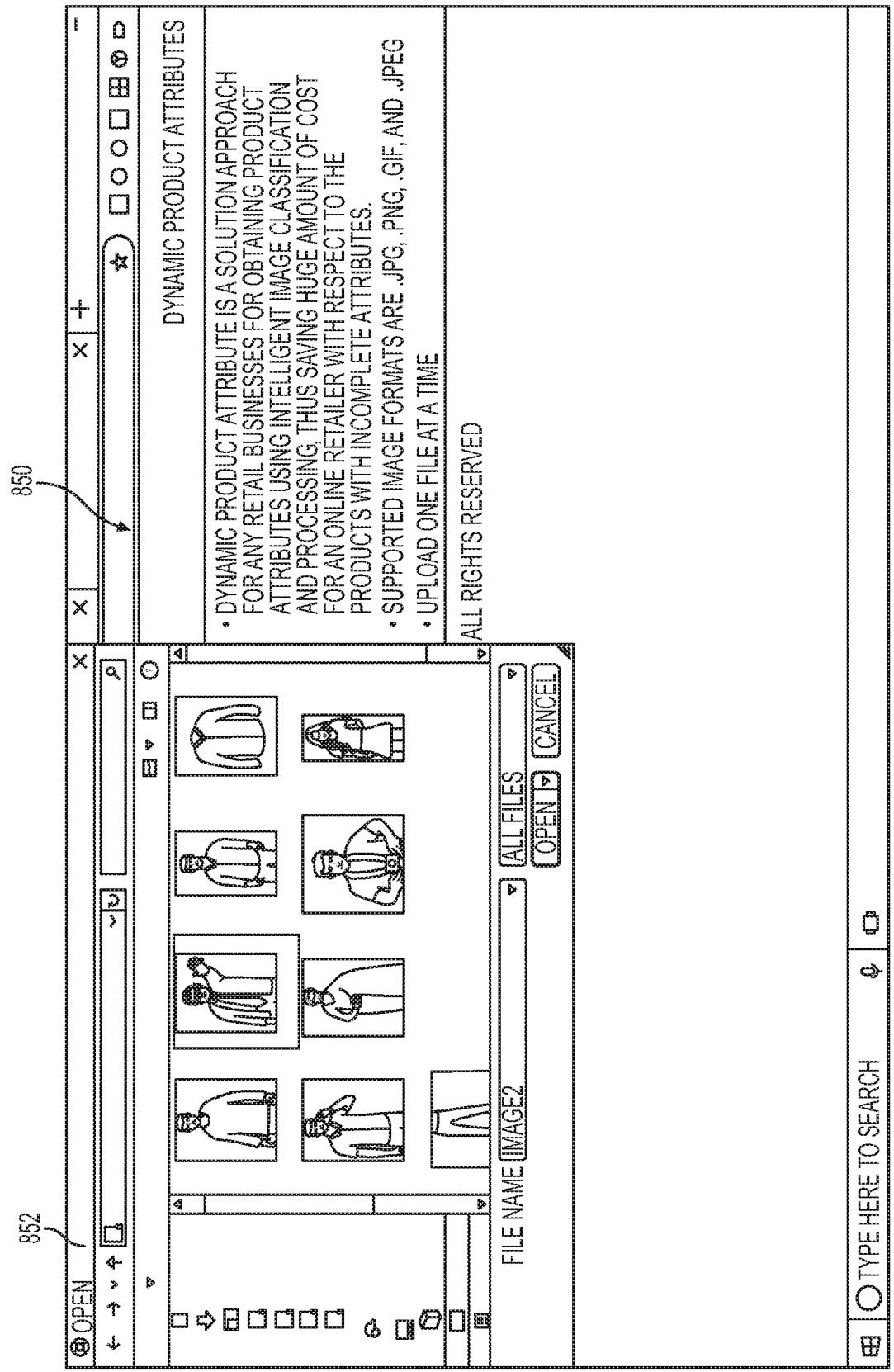
FIGS. 8A and 8B show the user interfaces associated with the recommender system.

FIG. 8A shows an example of an initial user interface 850 that can be displayed upon accessing the recommender system 100. The user interface 850 can enable opening a file selection box 852 that facilitates selecting an image for which attributes are to be extracted and relevant or matching items are to be identified from the stored images 148.

Figure 8B:
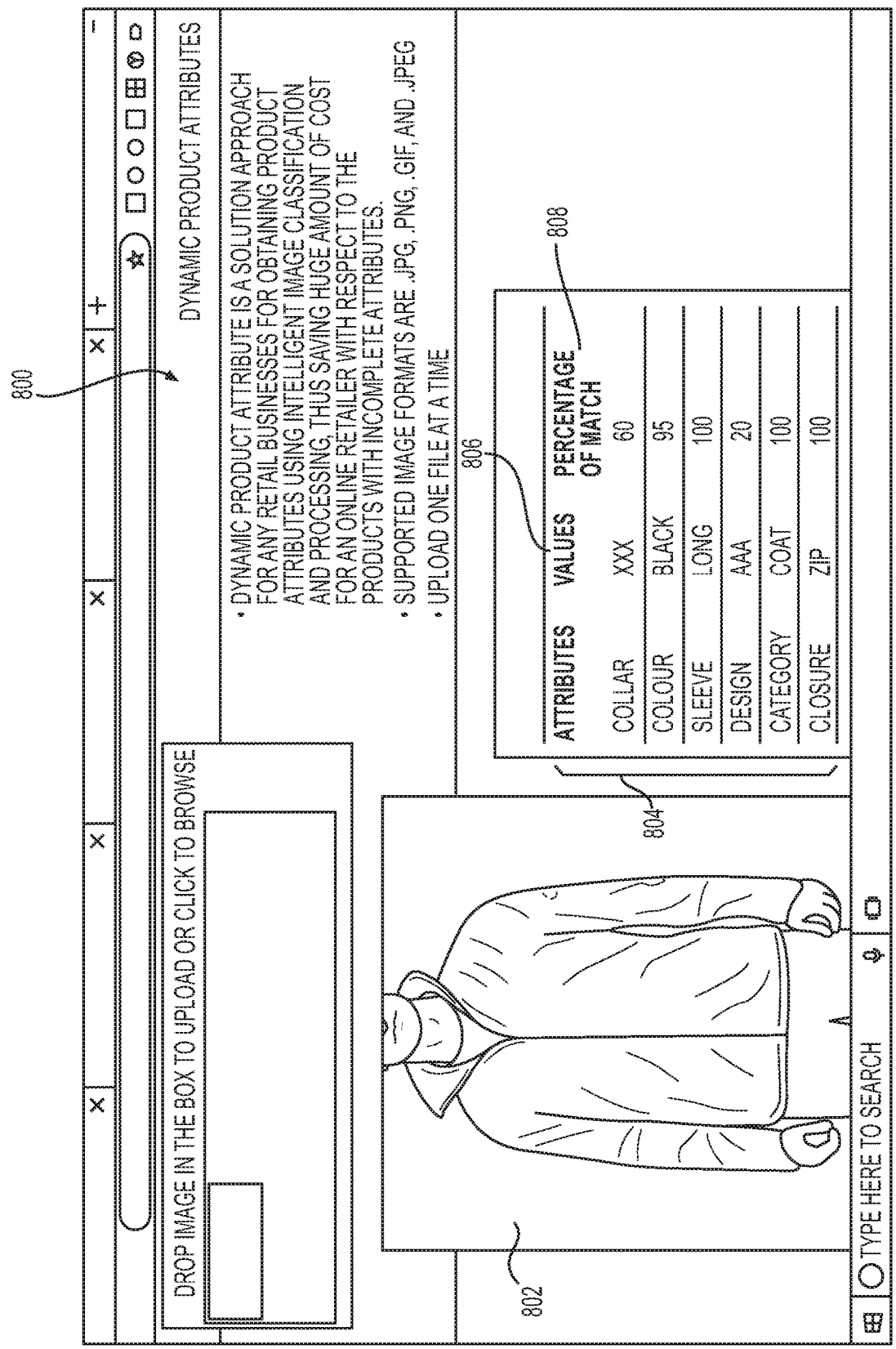

FIG. 8B shows an example of a graphical user interface (GUI) 800 that displays a listing of the product attributes corresponding to the first and second subsets of features extracted from the image 802 in accordance with the examples disclosed herein. The image 802 has been provided as the input image 156 by a user device. In an example, the area of the user interface 800 including the image 802 can encompass a drag-and-drop area wherein the image 802 can be dragged and dropped from local files on a computer displaying the user interface 800. The recommender system 100 automatically extracts the first set of attributes 804 corresponding to the shape features such as but not limited to collar, color, sleeve, design, category, closure, etc. The second subset of features corresponding to colors can also be extracted automatically using the attributes 804 of the object (i.e., the coat) in the image 802 in accordance with the methodologies disclosed herein. The various values 806 of the attributes 804 of collar, sleeve etc. and the percentage of match 808 or confidence in identification of the attributes are also displayed. Therefore, the recommender system 100 is configured to identify and extract the colors and designs of one or more structural elements such as the collar or sleeves or the body of the coat shown in the image 802. Thus, the recommender system 100 not only enables providing relevant products but also facilitates automatically identifying attributes of products thereby saving time and expenses for retailers in cataloguing attributes of each product. In fact, the recommender system 100 may be able to provide attributes that were not manually catalogued previously thereby improving the quality of information pertaining to the product. For example, an attribute such as a 'closure' with a 'Zip' value may have been automatically identified by the recommender system 100 for a 'coat' category product.

Figure 9:
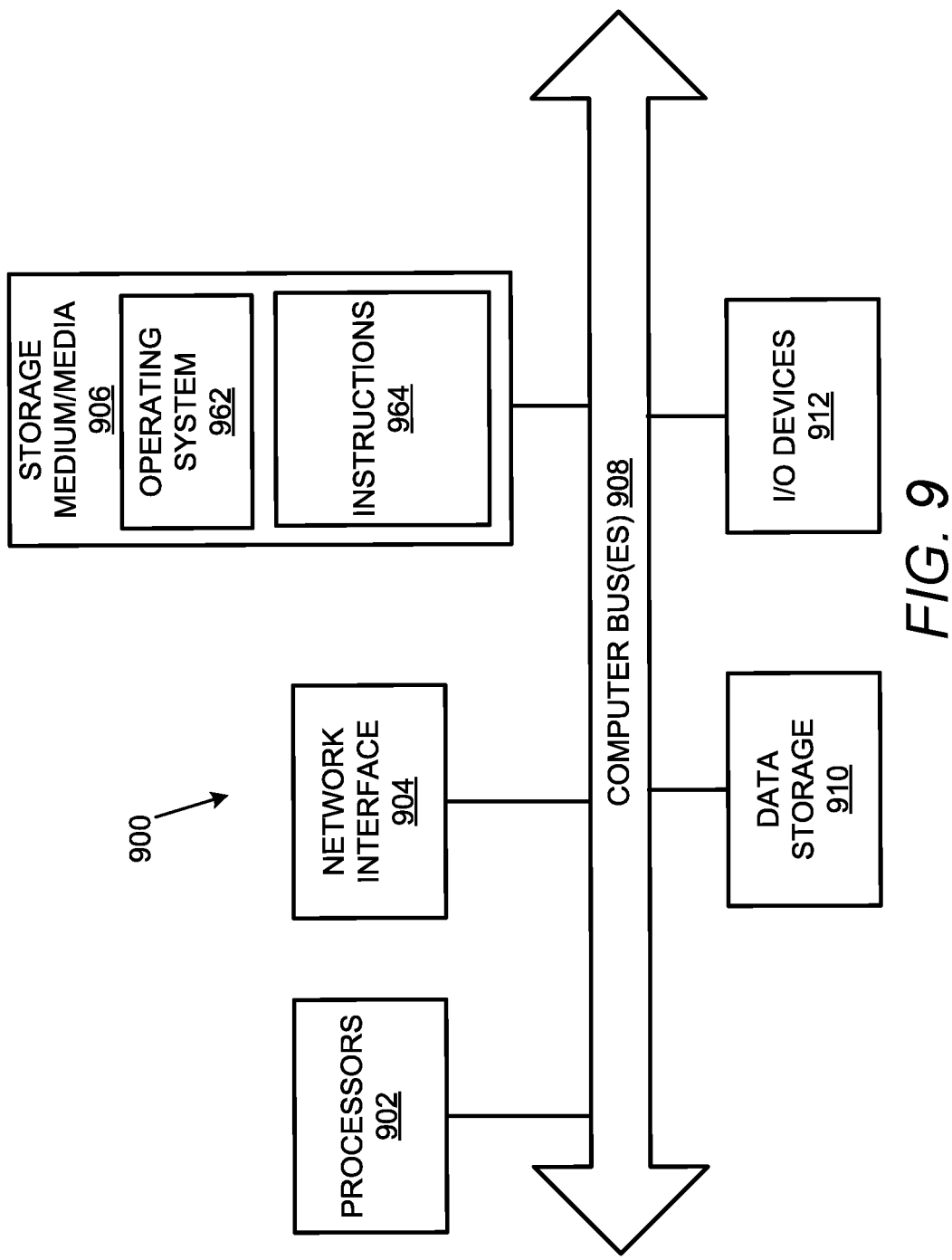
FIG. 9 illustrates a computer system that may be used to implement the recommender system in accordance with the examples disclosed herein.

FIG. 9 illustrates a computer system 900 that may be used to implement the recommender system 100. More particularly, computing machines such as desktops, laptops, smartphones, tablets, wearables which may be used to generate or access the data from the recommender system 100 may have the structure of the computer system 900. The computer system 900 may include additional components not shown and some of the components described may be removed and/or modified. In another example, a computer system 900 can sit on external-cloud platforms such as, Amazon Web Services, or internal corporate cloud computing clusters, or organizational computing resources, etc.

The computer system 900 includes processor(s) 902, such as a central processing unit, ASIC or other type of processing circuit, input/output devices 912, such as a display, mouse keyboard, etc., a network interface 904, such as a Local Area Network (LAN), a wireless 802.11x LAN, a 3G or 4G mobile WAN or a WiMax WAN, and a computer-readable medium 906. Each of these components may be operatively coupled to a bus 908. The computer-readable medium 906 may be any suitable medium which participates in providing instructions to the processor(s) 902 for execution. For example, the computer-readable medium 906 may be non-transitory or non-volatile medium, such as a magnetic disk or solid-state non-volatile memory or volatile medium such as RAM. The instructions or modules stored on the computer-readable medium 906 may include machine-readable instructions 964 executed by the processor(s) 902 to perform the methods and functions of the recommender system 100.

The recommender system 100 may be implemented as software stored on a non-transitory computer-readable medium and executed by the one or more processors 902. For example, the computer-readable medium 906 may store an operating system 962, such as MAC OS, MS WINDOWS, UNIX, or LINUX, and code 964 for the recommender system 100. The operating system 962 may be multi-user, multiprocessing, multitasking, multithreading, real-time and the like. For example, during runtime, the operating system 962 is running and the code for the recommender system 100 is executed by the processor(s) 902.

The computer system 900 may include a data storage or non-transitory computer readable storage medium 910, which may include non-volatile data storage. The data storage 910 stores data used by the recommender system 100 The data storage 910 may be used to store the input images, the stored images, the extracted product attributes etc.

The network interface 904 connects the computer system 900 to internal systems for example, via a LAN. Also, the network interface 904 may connect the computer system 900 to the Internet. For example, the computer system 900 may connect to web browsers and other external applications and systems via the network interface 904.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. An image-based classification and recommender system comprising:
   at least one processor;
   a non-transitory processor readable medium storing machine-readable instructions that cause the at least one processor to:
   receive an input image from a user device,
   the input image including an object;
     categorize, using a machine learning (ML) model, the object in the input image into at least one category, the at least one category being one of a plurality of product categories;
     generate a grayscale version of the input image;
     enhance contrasts between different shades in the grayscale version of the input image;
     delineate contours between regions corresponding to the different shades in the grayscale version with the enhanced contrasts;
     identify structural elements of the object based on the contours;
     extract, using the ML model and based on the at least one category, a first subset of features from the input image,
       the first subset of features pertaining to the structural elements of the object;
     superimpose the contours at respective positions on the input image;
     extract, using the ML model, a second subset of features from the input image upon extracting the first subset of features,
       the second subset of features corresponding to color features of the structural elements of the object outlined by the contours superimposed on the input image;
       identify colors within the regions delineated by the contours upon the superimposition;
     analyze a plurality of stored images for objects that match the object in the input image,
       the plurality of stored images pertaining to objects categorized into the at least one category;
     identify, based on the analysis of the plurality of stored images, one or more of the stored images comprising objects,
       the objects in the one or more stored images being similar to the object in the input image; and
     transmit the one or more stored images,
       the transmitted one or more stored images operating as recommendations, and
       the transmitted one or more stored images being transmitted to the user device.

2. The recommender system of claim 1, wherein the ML model includes a convolution neural network (CNN) having learnable weights and biases.

3. The recommender system of claim 1, comprising further instructions that cause the processor to:
   collect training images from a plurality of sources; and
   pre-process the training images for training the ML model.

4. The recommender system of claim 3, wherein the instructions for pre-processing the images comprise further instructions that cause the processor to:
   resize the training images to predefined standard sizes; and
   whiten, flip, distort and tile the training images based on one or more of the plurality of product categories associated with the images.

5. The recommender system of claim 3, wherein the instructions for pre-processing the images comprise further instructions that cause the processor to:
   develop the ML model by training an initial predetermined ML model on the preprocessed training images.

6. The recommender system of claim 1, further comprising instructions that cause the processor to:
   enable displaying the object attributes corresponding to the first subset of features and the second subset of features on a user interface of the user device.

7. The recommender system of claim 1, wherein the instructions for analyzing the plurality of stored images for objects that match the object in the input image, comprises further instructions that cause the processor to:
   determine aggregated feature vector distances of the objects in the plurality of stored images with the object in the input image.

8. The recommender system of claim 7, wherein the instructions for identifying one or more of the stored images with objects that are similar to the object, comprises further instructions that cause the processor to:
   score the plurality of stored images based on aggregated feature vector distances; and
   rank the plurality of stored images based on the scores.

9. A method of generating image-based recommendations comprising:
   collecting training images from a plurality of sources;
   pre-processing the images for training an initial machine learning (ML) model in image attribute extraction and product categorization;
   generating a ML model by training the initial ML model on the processed images;
   receiving at least one image,
     where the at least one image comprises an object;
   categorizing, using the ML model, the object in the at least one image into one or more of a plurality of product categories;
   generating a grayscale version of the at least one image;
   enhancing contrasts between different shades in the grayscale version of the at least one image;
   delineating contours between regions corresponding to the different shades in the grayscale version with the enhanced contrasts;
   identifying structural elements of the object based on the contours;
   extracting, using the ML model, a first subset of features from the at least one image based at least on the one or more product categories,
     where the first subset of features pertain to the structural elements of the object;
   superimposing the contours at respective positions on the at least one image;
   extracting, using the ML model, a second subset of features from the at least one image,
     where the second subset of features correspond to color attributes of the structural elements of the object outlined by the contours superimposed on the at least one image;

identifying colors within the regions delineated by the contours upon the superimposition; and enabling display of attributes corresponding to image features of the object via a graphical user interface (GUI).

10. The method of claim 9, where the received image includes a plurality of received images and categorizing the object in the received image further comprises:

categorizing a plurality of objects respectively included in each of the plurality of received images into one or more of the plurality of product categories.

11. The method of claim 9, further comprising:

receiving an input image from a user device, where the input image includes a user-selected object;

categorizing the user-selected object into one or more of the plurality of product categories;

extracting, using the ML model, a first subset of features from the input image based at least on the one or more product categories where the first subset of features pertain to structural elements of the user-selected object;

extracting, using the ML model, a second subset of features from the input image, where the second subset of features correspond to color features of the user-selected object and the second subset of features are extracted using the first subset of features extracted from the input image; and estimating similarities of features extracted from the input image with features of a plurality of stored images that are categorized into the plurality of product categories.

12. The method of claim 11, further comprising:

identifying one or more of the products relevant to the object in the input image based on the similarities; and transmitting one or more of the plurality of stored images corresponding to the one or more products that are relevant to the object as recommendations to the user device.

13. The method of claim 12, wherein identifying one or more of the products relevant to the object further comprises:

using textual features associated with the products and purchase history of a user associated with the input image for the identification of the products relevant to the object.

14. The method of claim 9, wherein the pre-processing of the training images further includes:

resizing the training images to predefined standard sizes; and whitening, flipping, distorting and tiling the training images based on one or more of the plurality of categories.

15. A non-transitory computer-readable storage medium comprising machine-readable instructions that cause a processor to:

receive an input image from a user device,
the input image including an object;

categorize, using a machine learning (ML) model, the object in the input image into at least one category,
the at least one category being one of a plurality of product categories;

generate a grayscale version of the input image;

enhance contrasts between different shades in the grayscale version of the input image;

delineate contours between regions corresponding to the different shades in the grayscale version with the enhanced contrasts;

identify structural elements of the object based on the contours;

extract, using the ML model and based on the at least one category, a first subset of features from the input image,
the first subset of features pertaining to the structural elements of the object;

superimpose the contours delineated from the input image at respective positions on the input image;

extract, using the ML model, a second subset of features from the input image upon extracting the first subset of features,
the second subset of features corresponding to color features of the structural elements of the object outlined by the contours superimposed on the input image;

identify colors within the regions delineated by the contours upon the superimposition;

analyze a plurality of stored images for objects that match the object in the input image,
the plurality of stored images pertaining to objects categorized into the at least one category;

identify, based on the analysis of the plurality of stored images, one or more of the stored images comprising objects,
the objects in the one or more stored images being similar to the object in the input image; and transmit the one or more stored images,
the transmitted one or more stored images operating as recommendations, and
the transmitted one or more stored images being transmitted to the user device.

16. The non-transitory computer-readable storage medium of claim 15, where the ML model includes a convolution neural network (CNN) having learnable weights and biases.

17. The non-transitory computer-readable storage medium of claim 16 wherein the CNN includes a n*n convolutional layers stacked in increasing depth where n is a natural number.

* * * * *